Jan. 10, 1928.

S. J. BENS 1,655,856

CHAIN SAW

Original Filed Nov. 9, 1922

Inventor:

Samuel J. Bens,

Attorneys

Patented Jan. 10, 1928.

1,655,856

UNITED STATES PATENT OFFICE.

SAMUEL J. BENS, OF NEW YORK, N. Y., ASSIGNOR TO CHAIN SAW CORPORATION, A CORPORATION OF DELAWARE.

CHAIN SAW.

Refile for abandoned application Serial No. 599,833, filed November 9, 1922. This application filed November 16, 1926. Serial No. 148,765.

My present invention relates to improvements in chain saws and more particularly to the pivots or joints between the tooth carrying links.

The invention aims to provide a simple, strong, and durable construction and one in which the manufacturing costs are reduced to a minimum.

With these and other objects in view, as will hereinafter appear, the invention includes the novel features of construction and arrangement and combination of parts hereinafter described, the precise nature and scope of my invention being defined by the appended claims.

An embodiment of my invention is illustrated in the accompanying drawing in which:—

Figure 1:
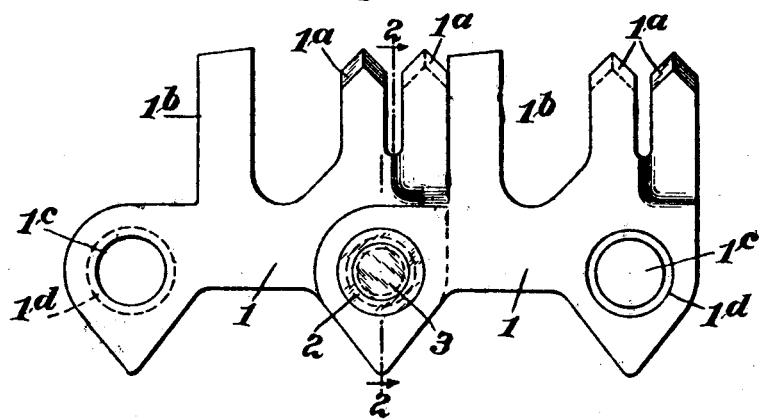
Figure 1 is a side elevation of a portion of an endless chain saw, showing two links connected by my improved joint.
Figure 2:
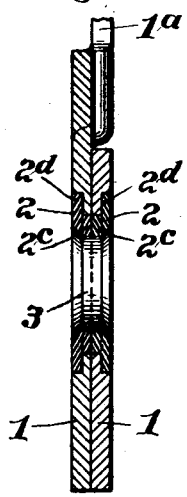
Fig. 2 is a section on line 2—2 of Fig. 1.
Figure 3:
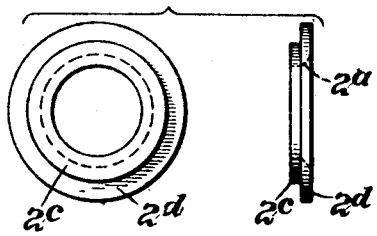
Fig. 3 is a detail view of the bearing ring members.

Referring by reference characters to this drawing, the numerals 1 1 designate the overlapping links of an endless chain saw, which links may be provided with the usual or any desired type of cutting and clearing teeth, though I prefer to use the arrangement shown in which each link carries a pair of cutting teeth $1^a$ at or near one end and a clearer tooth $1^b$ adjacent the other end.

The overlapping portions of these links are provided with aligning openings $1^c$ and in the preferred embodiment of my invention these openings are provided with annular rebates $1^d$, these rebates being so arranged or located that when two links are placed or assembled in overlapping position the rebates are on or in the outer faces of the links. Each rebate preferably occupies one-half the thickness of its link, as shown, and is of right-angular formation.

The numerals 2 2 designate a pair of complementary bearing rings which have cylindric parts $2^c$ designed to fit the openings in the chain links, and annular flanges $2^d$ adapted to fit the rebates $1^d$.

These bearings rings are so formed, and of such size that when assembled from opposite sides with their cylindric parts in the openings, each lies wholly within the plane of its corresponding link member with its opposite faces flush with the corresponding faces of the link, and the inner or reduced ends abut against each other in the plane of contact of the overlapping links.

Figure 4:
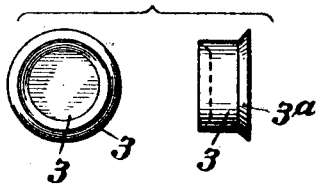
Fig. 4 is a detail view of the rivet before application to the saw.
Figure 5:
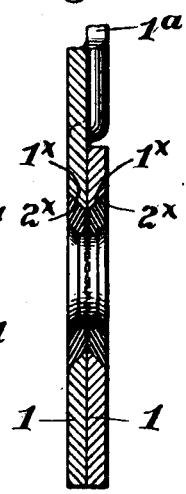
Fig. 5 is a view of a modification.

The center openings in the rings are countersunk or beveled adjacent their outer faces, as indicated at $2^a$. Through the open center of the abutting rings is inserted the rivet, indicated at 3 in Fig. 4, which has a flared head $3^a$ designed to fit one of the countersinks $2^a$, the other end being shaped to enter the open center of the rings and being adapted to be thereafter upset to fill the other countersink and thereby hold the two rings together and likewise, due to the shape of the rings and the manner in which they engage the links, to hold the links pivotally together.

By this arrangement I am enabled to form the rings of tempered steel to coact with the tempered steel links, and to employ a relatively soft metal for the rivets, which is capable of being upset, as the rivet locks the two rings firmly together and makes them in effect, when in use, a single ring, all wear in the pivotal action of the links is borne wholly by the wear rings. As the rings can be of relatively large diameter, the central openings are relatively large which enables me to use a rivet of sufficiently large diameter to secure ample strength to connect the two rings firmly together.

The shape of the rings is such that they can be readily manufactured in quantity by automatic machinery, and the rivets are likewise capable of being easily and cheaply produced.

Heretofore it has been customary, so far as I am aware, to use a rivet which also serves as a pivot member, and to give it the necessary hardness to resist wear, attempts have been made to produce a rivet having a tempered body and softer head or end capable of being upset, but in chain saw construction, due to the thinness of the links, the rivet must be so short that this is not possible.

Instead of forming the rebates in the links, of right-angular shape, as hereinbefore described, they may be of beveled formation, as indicated at $1^x$ and the corresponding surfaces of the rings may be beveled as indicated at 2×, but I prefer the angular formation just described as capable of being more easily and accurately manufactured.

Having thus described my invention, what I claim is:—

1. In a chain saw, a pair of overlapping links having aligning openings, the outer edges of the openings formed by the assembled links being countersunk, a pair of reversely placed tempered wear rings each of the thickness of a link fitting the openings in the overlapping links, and a relatively soft metal rivet passing through the rings and holding them rigidly together.

2. In a chain saw, a pair of overlapping links having aligning openings, the outer edges of the openings formed by the assembled links being provided with counter-sinks of right-angular formation, a pair of reversely placed tempered wear rings each of the thickness of a link and having a cylindrical portion fitting the openings in the overlapping links and having annular flanges fitting said counter-sinks, and a rivet passing through the open center of the rings and holding them rigidly together.

3. In a chain saw, a pair of overlapping links having aligning openings, the outer edges of the openings formed by the assembled links being countersunk, a pair of reversely placed tempered wear rings of the thickness of a link fitting the openings in the overlapping links, the open centers of said rings having countersunk outer edges contacting with the entire periphery of the opening in a link, and a soft metal rivet passing through said open centers and having headed ends filling said counter-sinks and locking said wear rings rigidly together.

In testimony whereof, I affix my signature.

SAMUEL J. BENS.